Sept. 20, 1955 E. GUSTAFSON 2,718,084
FISHING PLUG RETRIEVER
Filed Feb. 24, 1954

INVENTOR
ERIC GUSTAFSON

BY *Herbert J. Jacobi*

ATTORNEY

United States Patent Office 2,718,084
Patented Sept. 20, 1955

2,718,084

FISHING PLUG RETRIEVER

Eric Gustafson, Little Rock, Ark.

Application February 24, 1954, Serial No. 412,201

5 Claims. (Cl. 43—17.2)

This invention relates to sporting goods and more particularly to a device for facilitating the recovery of fish hooks, fishing plugs, fishing lures, sinkers and the like, when the same becomes lodged in, or attached to an object beneath the surface of the water.

Heretofore, numerous devices for the recovery of fishing plugs and the like, have been proposed, but these have been somewhat unsatisfactory due to the fact, that they very often become detached from the fishing line, thereby materially increasing the difficulty of dislodging the fishing plug and furthermore, such prior art devices were somewhat cumbersome and inconvenient to use and were also of such a nature that they could not be conveniently carried and were often subject to loss.

It is accordingly an object of this invention to provide a fishing plug retriever which may be made in sections of convenient length, which may be easily joined together in order to produce a device of any desired length, which device may be of relatively lightweight and convenient to transport and use.

A further object of the invention is the provision of a fishing plug retriever which may be securely attached to the fishing line and thereby directed to the plug to be retrieved.

A still further object of the invention is the provision of a fishing plug retriever which may be manufactured of relatively lightweight material and yet a device which will have sufficient strength to perform any desired dislodging operation.

Another object of the invention is the provision of a fishing plug retriever having a portion formed thereon to facilitate movement of stones or the like, between which the fishing plug may have become lodged.

A further object of the invention is the provision of a fishing plug retriever provided with means whereby loss of such retriever is prevented.

A still further object of the invention is the provision of a fishing plug retriever having means for detachably retaining such retriever on a fishing line, which means may be conveniently manipulated for application and removal of the retriever from such fishing line.

Figure 1:
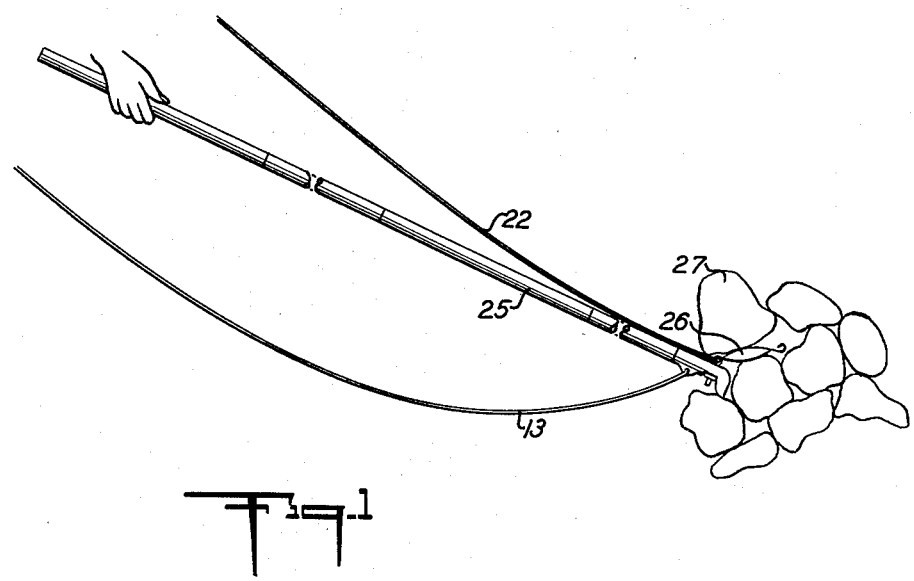
Figure 2:
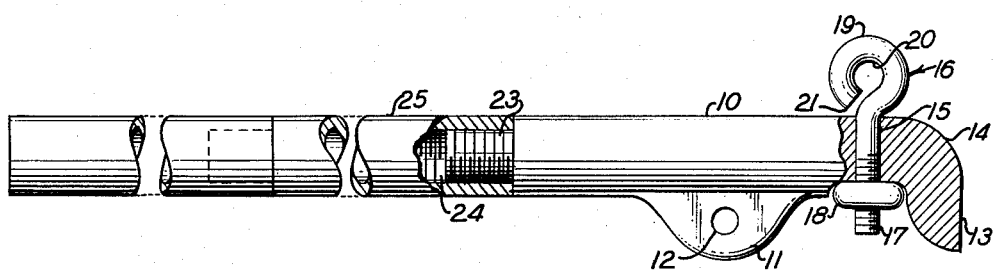
Figure 2:
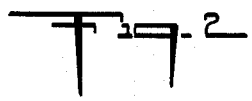

Further objects and advantages of the invention will be apparent from the following description taken in conjunction with the accompanying drawings wherein:

Fig. 1 is an elevational view showing the fishing plug retriever of this invention and the manner in which the same is utilized to dislodge a fishing plug from between stones beneath the surface of the water;

Fig. 2, an elevational view of the fishing plug retriever of this invention with parts in section for greater clarity and showing the means for releasably securing the retriever on a fishing line and also the means for attaching elongated sections to provide a retriever of any desired length.

With continued reference to the drawing there is shown a fishing plug retriever constructed in accordance with this invention and comprising an elongated body 10, this body being manufactured from any suitable lightweight material such as aluminum, magnesium, plastic or the like. The body 10 may be cast or may be formed in any other desired manner. Body 10 is provided with a laterally extending ear 11 which may also be provided with an aperture 12 for receiving a line 13 which may lead to the boat wharf, or other location of the fisherman, such line 13 serving as a means to prevent loss of the fishing plug retriever, in the event the same is dropped overboard by the fisherman.

Body 10 of the fishing plug retriever of this invention is also provided at one end thereof, with a laterally extending nose portion 13, which may be provided with a curved portion 14 joining the nose portion 13 and the body 10. The purpose of this curved portion 14 will presently appear.

Rearwardly of the nose portion 13, the body 10 is formed with a transverse aperture 15 for slidably receiving an eye bolt 16, the shank of which is threaded at 17 to receive a nut 18 disposed between the nose portion 13 and the ear 11. Eye bolt 16 is provided with a curved portion 19 which form an eye 20 and it is to be noted that curved portion 19 terminates at 21 in spaced relation to the shank 15. This provides an opening through which a fishing line 22 may be inserted into the eye 20 and removed therefrom.

The body 10 is provided at the opposite end from the laterally extending nose portion 13 with a threaded shank 23 which serves to receive a threaded aperture 24 in an elongated rod 25. Any number of rods 25 may be provided in order to make up a handle or pole of any desired length and in using the fishing plug retriever of this invention, the rod or pole made up of the sections 25 may be grasped in the hand of the fisherman, as shown in Fig. 1.

For the purpose of illustrating the use of the device, it may be assumed that as shown in Fig. 1, a fishing plug 26 has become lodged between stones or the like, 27, beneath the surface of the water and that removal of the plug 26 therefrom, by pulling on the fishing line 22, is impossible. In the use of the device, the nut 18 is loosened sufficiently to allow the fishing line 22 to be passed through the opening between the end 21 of the curved portion 19 of the eye bolt 16, and the shank 15 thereof into the eye 20 whereupon the nut 18 is tightened to move the end 21 of the eye bolt 16 into close proximity to the surface of the body 10. It is also assumed that a safety line 13 has been passed through the aperture 12 in the ear 11 and attached to the bolt or wharf in order to prevent the loss of the fishing plug retriever in the event the same is dropped overboard. The fishing plug retriever is moved downwardly along the line 22 until the eye bolt 16 engages the fishing plug 26 at which time the retriever may be manipulated in such a manner as to dislodge the plug 26 from between the stones 27 or from any other object upon which the plug may be caught. The curved portion 14 on the laterally extending nose portion 13 of of the body 10, permits movement of the plug 26 in all directions including toward the body 10 and consequently, dislodgement of the plug is greatly facilitated. Furthermore, the nose portion 13 may be used to move the stones 27 or other objects to one side, thereby further facilitating dislodgement of the plug 26. As soon as the plug 26 is dislodged, the same together with the fishing plug retriever may be retracted by the fisherman and the fishing line 22 removed from the eye bolt 16 by loosening the nut 18 and removing the line 22 from the eye 20. The elongated sections 25 may then be disassembled in order to conveniently pack and carry the fishing plug retriever.

It will be seen that by the above described invention there has been provided a relatively lightweight, simple and inexpensive fishing plug retriever which may be utilized to dislodge or retrieve a fishing plug or the like from any object upon which the same may be caught at any reasonable distance below the surface of the water, and furthermore, the device includes means whereby the same is securely attached to a fishing line, in order to guide the same to the fishing plug and to prevent disengagement from such device from the fishing line until the plug has been dislodged. The fishing plug retriever further, may be constructed of relatively lightweight rust proof material and may be of such a size as to be conveniently transported from place to place and assembled for use within a comparatively short time.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A fishing plug retriever comprising an elongated body having an ear extending laterally therefrom substantially midway of the length thereof, an aperture in said ear for receiving a safety line, a laterally extending nose portion at the outer end of said body and having a curved surface connecting the outer end surface with the adjacent portion of said body, said body having a transverse aperture adjacent said nose portion, an eye bolt slidably received in said transverse aperture and a nut threadedly received on said eye bolt, said eye bolt having an opening communicating with the eye whereby a fishing line may be inserted and removed from the eye and said body having a reduced threaded extension at the inner end thereof for detachably receiving a handle.

2. A fishing plug retriever comprising an elongated body having an ear extending laterally therefrom substantially midway of the length thereof, an aperture in said ear for receiving a safety line, a laterally extending nose portion at the outer end of said body and having a curved surface connecting the outer end surface with the adjacent portion of said body, said body having a transverse aperture adjacent said nose portion, an eye bolt slidably received in said transverse aperture and a nut threadedly received on said eye bolt, said eye bolt having an opening communicating with the eye whereby a fishing line may be inserted and removed from the eye, and means at the inner end thereof for detachably receiving a handle.

3. A fishing plug retriever comprising an elongated body having an ear extending laterally therefrom substantially midway of the length thereof and means on said ear for receiving a safety line, a laterally extending nose portion at the outer end of said body and having a curved surface connecting the outer end surface with the adjacent portion of said body, said body having a transverse aperture adjacent said nose portion, an eye bolt slidably received in said transverse aperture and a nut threadedly received on said eye bolt, said eye bolt having an opening communicating with the eye whereby a fishing line may be inserted and removed from the eye and said body having means at the inner end thereof for detachably receiving a handle.

4. A fishing plug retriever comprising an elongated body having means for receiving a safety line, a laterally extending nose portion at the outer end of said body having a curved surface connecting the outer end surface thereof with the adjacent portion of said body, said body having a transverse aperture adjacent said nose portion, an eye bolt slidably received in said transverse aperture, a nut threadably received on said eye bolt, said eye bolt having an opening communicating with the eye, whereby a fishing line may be inserted and removed from the eye and said body having means at the inner end thereof for detachably receiving a handle.

5. A fishing plug retriever comprising an elongated body having a laterally extending nose portion at the outer end thereof and having a curved surface connecting the outer end surface with the adjacent portion of of said body, said body having a transverse aperture adjacent said nose portion, an eye bolt slidably received in said transverse aperture, a nut threadedly received on said eye bolt, said eye bolt having an opening communicating with the eye whereby a fishing line may be inserted and removed from the eye, and said body having means at the inner end thereof for detachably receiving a handle.

References Cited in the file of this patent

UNITED STATES PATENTS

| | | |
|---|---|---|
| 2,083,814 | Bence | June 15, 1937 |
| 2,300,840 | Huxel | Nov. 3, 1942 |
| 2,562,413 | Carr | July 31, 1951 |